United States Patent

[11] 3,611,378

[72] Inventors Ian Frederick Howard Goult;
John Stuart Fraser Lee, both of Enfield, Middlesex, England
[21] Appl. No. 832,359
[22] Filed June 11, 1969
[45] Patented Oct. 5, 1971
[73] Assignee International Standard Electric Corporation
[32] Priority July 15, 1968
[33] Great Britain
[31] 33674/68

[54] FM/CW RADIO ALTIMETER
1 Claim, 3 Drawing Figs.
[52] U.S. Cl. .................................................. 343/14, 343/12 A
[51] Int. Cl. .................................................. G01s 9/24
[50] Field of Search ........................................ 343/14, 12 A

[56] References Cited
UNITED STATES PATENTS
3,403,398  9/1968  Engholm et al. ............... 343/14

Primary Examiner—T. H. Tubbesing
Attorneys—C. Cornell Remsen, Jr., Walter J. Baum, Paul W. Hemminger, Percy P. Lantzy, Philip M. Bolton, Isidore Togut and Charles L. Johnson, Jr.

ABSTRACT: In an FM/CW altimeter the combined beat frequency signals $f_1$ and $f_2$ ($f_2 \approx 2f_1$), due to desired ground and undesired ground-plane-ground reflections, are connected to a monostable multivibrator and to a frequency counter. Said frequency counter responds to the mean frequency of the input beat frequencies $f_1$ and $f_2$ and provides a signal to said multivibrator to control its recovery time to $2/3f_1$. The output of said multivibrator is a pulse signal at a frequency $f_1$ which is connected to an average frequency counter. Said counter measures height.

PATENTED OCT 5 1971 3,611,378

Inventors
IVAN F. H. GOULT
JOHN S. F. LEE
By Carlos Neves
Attorney

FM/CW RADIO ALTIMETER

BACKGROUND OF THE INVENTION

1. Field of the Invention

This invention relates to frequency-modulated, continuous wave, radio altimeters and more particularly to an altimeter wherein false or ambiguous readings which arise from the phenomenon of "double-bounce" are avoided.

2. Description of the Prior Art

During the operation of radio altimeters in aircraft at altitudes between 0 and 500 feet (0 and 150 meters), there can occur a phenomenon commonly referred to as "double-bounce." This is illustrated in FIG. 1 of the accompanying drawings, and is due to a signal from the altimeter transmitter Tx being reflected from the ground (or equivalent reflecting surface, e.g. sea) back to the underside of the aircraft, where it is reflected back to the ground and re-reflected from there back to the receiver Rx of the radio altimeter.

Although the received signal is severely attenuated by this triple reflection, it is not so severely attenuated as not to be detectable by the altimeter, particularly in conditions when the primary return signal has faded for one reason or another, usually owing to multiple-path reflections. The propagation time of the double-path signal results in a beat note in the altimeter the frequency of which note is, to a near approximation, twice that for the primary signal of a direct return.

SUMMARY OF THE INVENTION

It is an object of the invention to provide a method of discriminating against this unwanted signal at approximately twice the frequency of the wanted signal in an FM/CW radio altimeter whereby only the basic frequency due to a single ground reflection is counted in the average rate counter normally forming part of such an altimeter, thus significantly reducing the incidence of "double-bounce" errors, and giving an output proportional to height with no transient effects due to reception of a signal representing twice the actual height of the aircraft.

According to the invention, therefore, there is provided an FM/CW radio altimeter which comprises a radio transmitter arranged to transmit FM signals towards a reflecting surface and a radio receiver arranged to receive signals reflected from such a surface; wherein said receiver comprises demodulating equipment arranged to derive series of beat notes from received reflected signals, and an average rate counter for counting the basic frequency $f_1$ of such beat notes, wherein $f_1$ is the beat note frequency due to signals traversing a single reflection path only; and wherein said receiver further comprises a second frequency counter and a multivibrator circuit, to both of which all said series of beat notes are applied, said second counter being responsive to the mean beat frequency applied to said multivibrator, and the and the output signal of said second counter is arranged to control the recovery time constant of said multivibrator whereby said multivibrator is not triggered until a period significantly in excess of one-half cycle period of the basic frequency $f_1$ to be counted.

BRIEF DESCRIPTION OF THE DRAWINGS

The invention will be further described with reference to the drawings accompanying the specification, in which.

DESCRIPTION OF A PREFERRED EMBODIMENT

Figure 1:
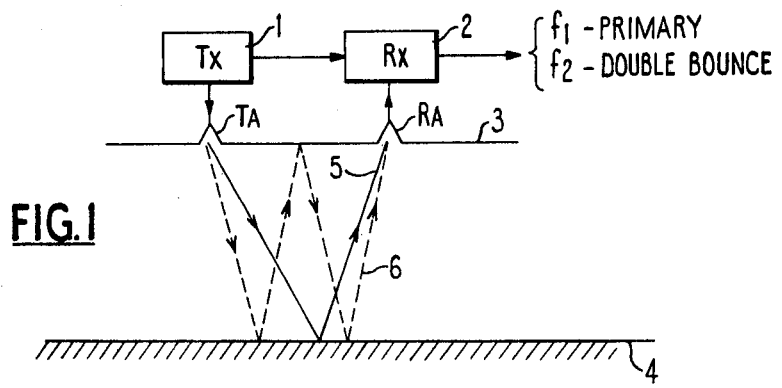
FIG. 1 (already referred to) illustrates the principles involved in conventional altimetry and the occurrence of "double-bounce;"

Referring again to FIG. 1, this shows blocks 1 and 2 representing the transmitter Tx and the receiver Rx of an altimeter, respectively coupled to antennae TA and RA inset in the undersurface 3 of an aircraft. Tx also feeds a cross-connected signal to Rx for deriving the beat note from the returned signals.

The primary reflecting path 5 via a reflecting surface 4, e.g. ground or water, is shown solid, while the double-bounce path 6 is shown dashed, and the beat signals derived in Rx from the respective return signals are shown as $f_1$ for the primary path and $f_2$ for the double-bounce path. The frequency $f_2$ is approximately double $f_1$.

Figure 2:
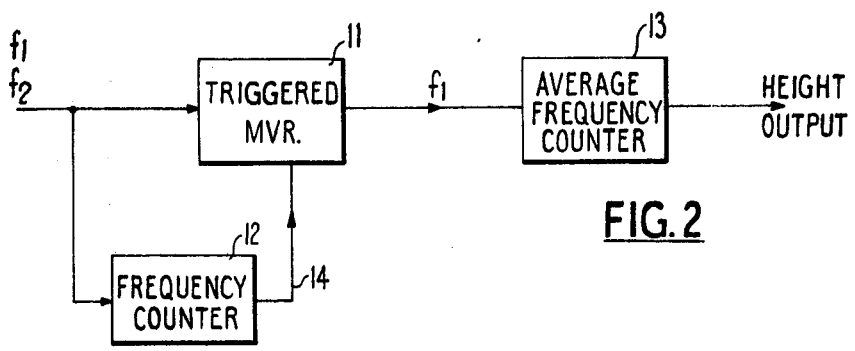
FIG. 2 is a block schematic of an embodiment of the invention.

FIG. 2 illustrates in block form the arrangements now proposed for the receiver. In this figure, 11 is a triggered multivibrator type of circuit or equivalent monostable circuit, 12 is a frequency counter, and 13 is the conventional average frequency counter of the altimeter, supposed to be responsive to beat frequency $f_1$ to give a height output to an indicating device (not shown) or flight control system.

Blocks 11 and 12, the inputs of which are in parallel, receive beat frequencies $f_1$ and $f_2$ (where $f_2$ is mainly $2f_1$) from Rx of FIG. 1. The counter 12 responds to the mean received frequency of the mixture of beat frequencies applied to this counter and the multivibrator. This mean frequency will be predominantly that due to the primary received signal, $f_1$, since the double-bounce signal, $f_2$, is of a transitory nature. The counter 12 delivers a DC controlling signal over lead 14 to multivibrator 11 to control the recovery time constant of the multivibrator. The control counter, 12, output is arranged to maintain the multivibrator in an unstable state, once triggered, for a period greater than $\frac{1}{2} \times 1/f_1$. During this period, further trigger pulses will not alter the state of the multivibrator. Thus, the multivibrator will never be triggered by the double-bounce beat note $f_2$ (i.e. $2f_1$) and its output may be fed into the average frequency counter 13, which will thus give an output directly proportional to $f_1$, and will take no cognizance of the double-bounce beat note $2f_1$ (or $f_2$).

The multivibrator thus acts as a filter for the mixture of genuine and spurious beat notes at its input, to give an output of genuine beat note $f_1$ alone, proportional to height with no transient effects due to reception of signals representing twice the true height.

Figure 3:
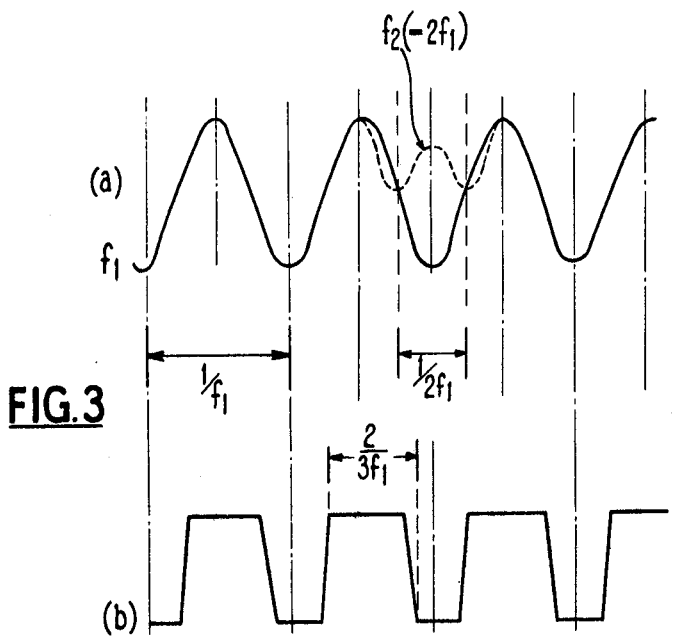
FIG. 3 is a timing diagram.

The process is illustrated graphically in FIG. 3, which shows, at $a$, a genuine beat note of $f_1$, in solid line, and a double-bounce beat note of frequency $2f_1$, shown dashed. The lower waveform, $b$, is the output pulse waveform from the multivibrator having a pulse repetition frequency of $f_1$ and a recovery time of $2/3f_1$.

We claim:

1. In an FM/CW altimeter of the type comprising a transmitter arranged to transmit an FM signal to a receiver via at least one reflecting surface; and a receiver having means for demodulating said FM signals to provide a primary and secondary beat note corresponding respectively to singly and multiply reflected signals, an arrangement for eliminating the effects of said multiply reflected signals comprising:

a multivibrator coupled to said demodulating means;

a frequency counter responsive to the mean frequency of said beat notes for controlling said recovery time to a value greater than one-half but less than the period of said primary beat note; and an average frequency counter for determining altitude coupled to said multivibrator.